United States Patent [19]
Williams

[11] Patent Number: 5,007,825
[45] Date of Patent: Apr. 16, 1991

[54] HEAT RECLAMATION APPARATUS

[76] Inventor: Robert M. Williams, 16 La Hacienda, Ladue, Mo. 63124

[21] Appl. No.: 525,650

[22] Filed: May 21, 1990

[51] Int. Cl.$^5$ ................................................ F27D 1/08
[52] U.S. Cl. ..................................... 432/99; 432/100; 432/206; 432/207
[58] Field of Search ................................. 432/96–100, 432/206, 207

[56] References Cited

U.S. PATENT DOCUMENTS

| | | | |
|---|---|---|---|
| 2,574,740 | 11/1951 | Hantman | 432/99 |
| 2,654,589 | 10/1953 | Somogyi | 432/99 |
| 2,948,521 | 8/1960 | Heiligenstaedt | 432/99 |
| 2,996,292 | 8/1961 | Graf et al. | 432/99 |
| 3,887,326 | 6/1975 | Townley | 432/99 |
| 4,008,994 | 2/1977 | Numasaki et al. | 432/99 |
| 4,850,861 | 7/1989 | Poroshia et al. | 432/99 |

Primary Examiner—Henry C. Yuen
Attorney, Agent, or Firm—Gravely, Lieder & Woodruff

[57] ABSTRACT

The apparatus herein comprises a kettle for calcining particulate material and a surrounding furnace having a porous wall to pass heat of combustion into the kettle at one side and to permit evacuation of the products of combustion from an opposite side, and a control system to cycle the combustion and the evacuation of products of combustion between the opposite sides so that the side being evacuated becomes a heat sink to return the heat so retained therein upon the combustion cycle whereby the furnace structure is kept to a desirable level of temperature while the material in the kettle is at a significant higher temperature.

4 Claims, 3 Drawing Sheets

HEAT RECLAMATION APPARATUS

BACKGROUND OF THE INVENTION

1. The Field of the Invention

This invention is directed to apparatus for reclaiming heat of combustion associated with calcining kettle means.

2. Description of the Prior Art

It is known that a mixture of gas and air can be passed through a porous wall so that combustion takes place over a large area of the wall on the side opposite to the side first impinged by the gas and air. Reference is directed to Holden U.S. Pat. No. 2,828,813 of Apr. 1, 1958, and the safety construction for a luminous wall furnace patent of Holden U.S. Pat. No. 3,008,513 of Nov. 14, 1961.

The examples of prior art show a concern for too much heat build-up in the furnace wall so that there is a danger of a back-fire or explosion. Another problem is found that operation of a furnace at a high temperature level can lead to progressive cracking and deterioration of the mortar between bricks, as well as flash back into the plenum chamber that can result in an explosion.

SUMMARY OF THE INVENTION

The invention is directed to apparatus for processing gypsum particulate material in which a porous wall surrounding a gypsum kettle is divided into portions so that one portion can present a luminous heat wall to the kettle and another portion of the porous wall becomes a heat sink for conservation of the heat delivery to the kettle.

It is an important feature of the invention to cycle the portions of the porous wall so that each can be used as a luminous wall part of the time and a heat sink part of the time; thereby keeping the porous wall at a desirable temperature level while the kettle is operated at a significant higher temperature suitable for calcining.

Another important feature of the invention is to provide a control system that cycles the effect of firing and heat sink accumulation so that the problems of the prior apparatus is avoided.

BRIEF DESCRIPTION OF THE DRAWINGS

The practice of the invention can be carried out with apparatus wherein.

DETAILED DESCRIPTION

Figure 1:
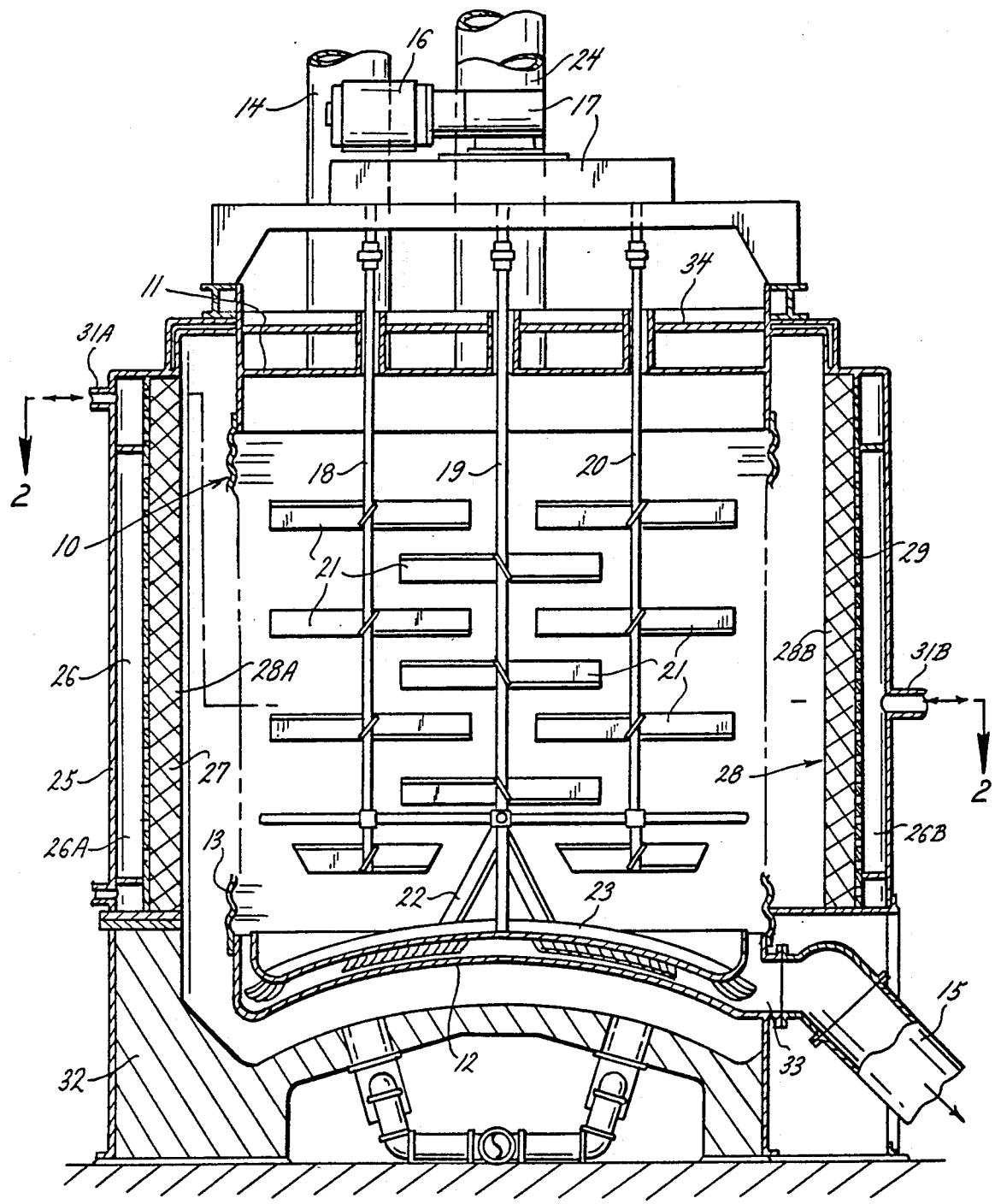
FIG. 1 is a vertical section through a calcining kettle provided with a porous wall and a surrounding plenum chamber constituting the apparatus.
Figure 2:
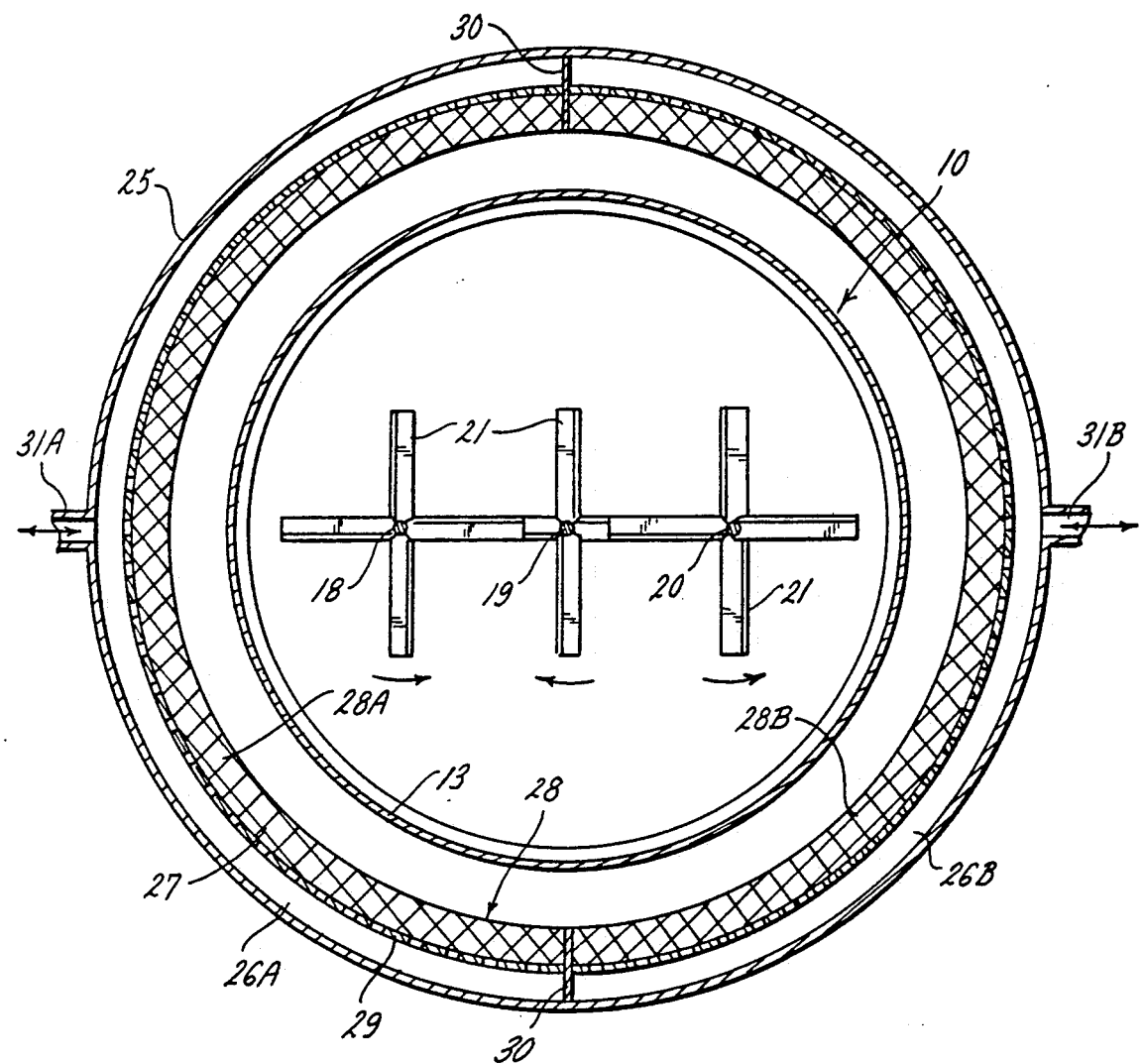
FIG. 2 is a transverse section of the apparatus taken along line 2—2 in FIG. 1.

Referring to FIGS. 1 and 2, one form of apparatus includes a kettle 10 having a top wall 11, a bottom wall 12 and side wall 13. The top wall is provided with an inlet 14 for the particulate material to be calcined, while there is an outlet 15 for the product. The particulate material during the calcining process is agitated by motor 16 operating through a gear box 17 to actuate drive shafts 18, 19 and 20 for the agitator blades 21. The shafts are stabilized adjacent the lower ends by arms 22 associated with a sweep scraper 23. The vapor driven off the particulate material escapes through a top vent 24.

The kettle 10 is enclosed in a furnace comprising an outer wall 25 forming a plenum chamber 26 which surrounds a porous means 27 presenting an inner face 28 to the kettle 10, which face is spaced from the kettle side wall 13. The outer side of the porous wall means is enclosed by a fire check perforated screen 29 which is exposed in the plenum chamber 26.

It is seen in FIG. 2 that the plenum chamber 26 is divided by stop wall means 30 into a first chamber portion 26A and a second chamber portion 26B. The stop wall means 30 also intersects the porous wall means 27 so as to divide that wall into parts 28A and 28B. The plenum chamber portion 26A is provided with a port 31A and the opposite plenum chamber portion 26B is provided with a port 31B.

Referring again to FIG. 1, the structure of the furnace chamber 25 is supported on a suitable base 32 having a space 33 to accommodate the product outlet 15. The plenum chamber has a top wall 34 which serves to suspend the kettle 10 within the porous wall means. Any suitable load carrying provision can be employed to support the kettle 10, and to support the drive motor 16 and the gear box 17, and the bottom wall 12 can be supported in the base 32 to the extent necessary.

Figure 3:
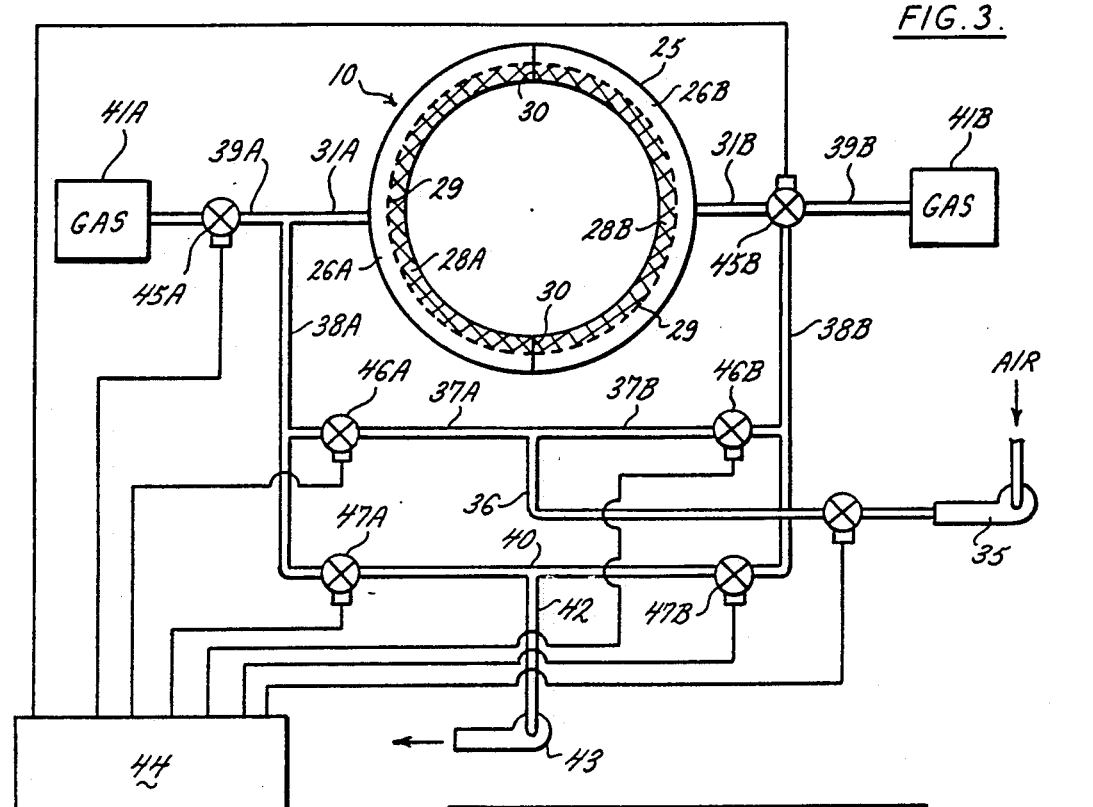
FIG. 3 is a schematic view of a control system for the apparatus of FIGS. 1 and 2.

Turning now to FIG. 3 there is shown schematically the control means for the apparatus of FIGS. 1 and 2 having the ports 31A and 31B. The control means includes a system of conduits, valves and fans in the following arrangement. A fan 35 has its outlet conduit 36 connected into a divider conduit having a branch 37A and a branch 37B. Branch 37A is connected into a conduit 38A extending from a conduit 39A at port 31A to a junction 40. Conduit 39A is connected into a source of gaseous fuel 41A. Branch conduit 37B is connected into a conduit 38B extending from a conduit 39B at port 31B to the aforesaid junction 40. Conduit 39B is connected into a source of gaseous fuel 41B. Also, the junction 40 which is common to conduits 38A and 38B is connected by conduit 42 to an exhaust fan 43.

The conduit system set forth above is under the control of a central console 44 which is connected to a group of respective motorized valves 45A, 46A and 47A, and motorized valves 45B, 46B and 47B. There is a common air supply fan 35, the operation of which is controlled by the console 44. The console 44 is provided with sequencing means which establishes a repetitive program, as follows:

- a first program for opening valves 46A, 45A, operating fans 35 and 43, and closing valves 45B, 46B and 47A.
- a second program for opening valves 46B, 45B and closing valves 45A, 46A and 47B, while allowing fans 35 and 43 to continue operating.
- a third program for alternating the period of operation of the first and second programs.

It is intended that the alternating periods of admitting gas and air at ports 31A and 31B shall be of the order of 20-60 seconds so that the temperature of the products of combustion can be kept to a range of from about 250° to 400° F., while maintaining the temperature in the kettle 10 in the range of from 1600° to 2500° F.

Figure 4:
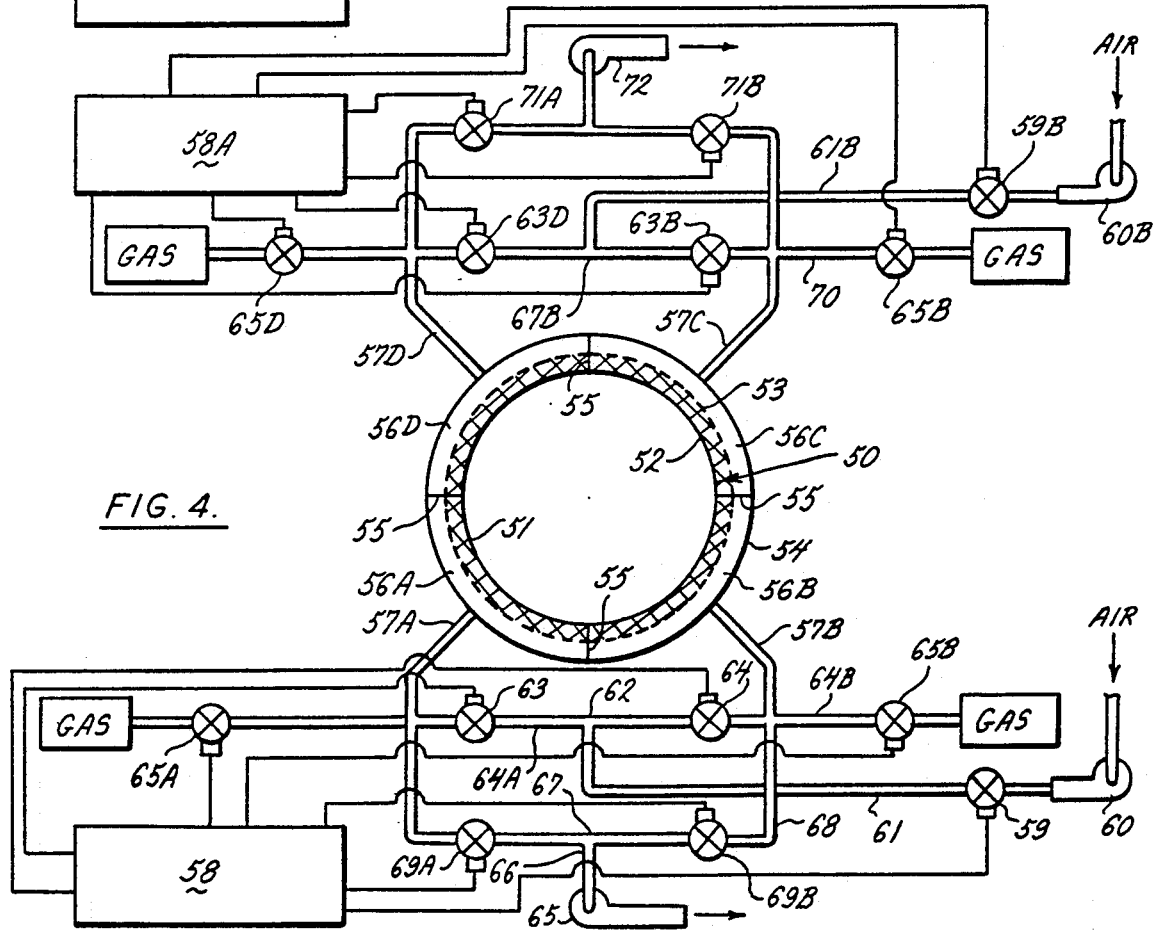
FIG. 4 is a schematic view of a modified apparatus and control for multiple plenum chambers.

A modified arrangement of apparatus is seen in FIG. 4 where the kettle 50 has a side wall 51 enclosed by a furnace assembly having a porous wall means 52 spaced from the kettle side wall 51. The porous wall 52 is surrounded on its exterior surface with a perforated fire check screen 53, and the screen 53 is enclosed by an outer wall 54 which is spaced therefrom to define a perimeter plenum chamber or space divided by stop wall means 55 to separate that space into four plenum chambers 56A, 56B, 56C and 56D. The chamber 56A has an external port 57A, chamber 57B has an external port 57B, chamber 56C has an external port 57C, and finally chamber 56D has an external port 57D. Though not shown, the kettle 50 has a top material inlet and a bottom product outlet substantially like the construction seen in FIG. 1.

Plenum chambers 56A and 56B are operably related so that gas and air admitted at port 57A is translated into a host of small flames all over the inner face of the adjacent porous wall 52, while the products of combustion are evacuated at port 57B from chamber 56B.

In like manner, the admission of gas and air at port 57C to chamber 56C is translated into a host of small flames all over the inner face of the porous wall 52, while the products of combustion are evacuated at port 57D. As explained above, the admission of gas and air at any inlet port, and the evacuation at any outlet port of the products of combustion can be reversed, preferably on a programmed basis, so the heat of combustion and its evacuation can be cyclically controlled as desired.

It is shown in FIG. 4 a control system governed by suitable operating provisions in the control console 58 which can be related by air admission valve 59 from a fan 60, the directing of that air by conduit 61 to a junction 62 to flow through either open valve of the valve 63 and valve 64. If valve 63 is open, valve 64 must be closed, thereby feeding air through conduit 64A to join with gaseous fuel from open valve 65A to enter the open port 57A. The products of combustion created in the inner space at the kettle side wall 51 are evacuated by action of an exhaust fan 65 connected by conduit 66 in junction 67 to a conduit 68 with an open valve 69B to extend to port 57B. At this time the gaseous fuel supply valve 65B is closed, as is valve 64. Upon switching the operation, air is conducted by conduit branch 64B on opening valve 64 while closing valves 63. At the same time, gas valve 65A must be closed, and valve 69A is opened to allow the fan 65 to evacuate the products of combustion through port 57A.

While the foregoing heating and evacuation is carried on at ports 57A and 57B, the other ports 57C and 57D are alternately used to accomplish the same sequence. Combustion air is supplied by fan 60B and conduit 61B with valve 59B open to junction 67B, and from there, the air flows in conduit 70 through open valve 63B to join with gaseous fuel from open valve 65B to feed port 57C to create combustion at the inner face of the porous wall means 52. The products of combustion are evacuated from that space through porous wall means and out through port 57D, past closed valve 65D and closed valve 63D, through open valve 71A, and past closed valves 71B, and is evacuated to atmosphere by fan 72. Here again the function of heating by supplying gas and air at port 57C, while evacuating the products of combustion at port 57D is understood to be cycled so port 57D can receive gas and air while the valve system is set to effect evacuation of products of combustion at port 57C. The setting of the various valves associated with ports 57C and 57D is effected by control means in console 58A. Whichever is the case selected, the porous wall means 52 can function as a heat sink when connected up on the evacuation cycle for the products of combustion.

What is claimed is:

1. In apparatus for processing gypsum particulate material in a kettle having top, bottom and side walls for containing the particular matter, the improvement of a furnace for applying heat to the gypsum particulate matter comprising:
    (a) a porous luminous fire wall means surrounding the outside of and spaced from the kettle walls, said porous luminous fire wall means being divided into first and second portions;
    (b) an enclosure for an spaced from each of said first and second portions of said luminous fire wall means, said enclosures defining separate plenum chambers on the outside of said first and second portion of said porous luminous fire wall means;
    (c) conduit means connected to each of said plenum chambers for alternately supplying a mix of fuel and air to a first one of said plenum chambers while concurrently evacuating products of combustion from a second one of said plenum chambers; and
    (d) control means operably connected to said conduit means for effecting the combustion of the fuel and air at a first portion of said porous luminous fire wall means and effecting the substantially evacuation of the products of combustion at a second plenum chamber for that portion of the porous fire wall means, said control means including means to time the duration of the heat of combustion and the evacuation of the products of combustion relative to said first and second plenum chambers for said portions of said porous luminous fire wall means, whereby said pourous luminous fire wall means projects the heat generated by combustion of the fuel and air at a first portion thereof into the kettle side wall and the heat from the products of combustion evacuated through a second portion of said porous fire wall means converts that porous fire wall means as a heat sink.

2. Apparatus for processing gypsum particulate material in a kettle having top, bottom and side walls for containing the particulate material, said apparatus comprising in combination the improvement of
    (a) a furnace surrounding at least the kettle side wall in spaced relation to form a furnace chamber, said furnace having
        (1) a porous wall means forming a luminous fire facing the kettle side wall
        (2) an enclosure surrounding said porous luminous fire wall means and spaced therefrom to form a plenum chamber, and
        (3) port means opening from the outside of said enclosure into said plenum chamber;
    (b) stop means in said furnace to divide said porous fire wall means and said plenum chamber into separate portions of said furnace;
    (c) a source of fuel and air for said furnace;
    (d) conduit means connected to said port means, to said source of fuel and air, and to ambient atmosphere;
    (e) a system of valves in said conduit means for selective operation of said valves;
    (f) valve control means connected to said valve means and operative to set said valve means to introduce fuel and air into said furnace at one portion of said plenum chamber for supporting combustion at said porous luminous fire wall means and to evacuate products of combustion from another portion of said plenum chamber to ambient atmosphere; and (g) system control means operating said valve control means to alternate the products of combustion and evacuation of products of combustion in said separate portion of said furnace, whereby said porous fire wall means at said other side becomes a heat sink to return heat at the next alternation.

3. Apparatus for calcining gypsum particulate material, said apparatus comprising in combination:

(a) a kettle having an imperforate side wall, an inlet for gypsum particulate material and an outlet for the calcined gypsum material;

(b) a furnace structure surrounding at least the side wall of said kettle, said furnace structure including an outer wall, an inner porous luminous heat wall presented in spaced relation to said kettle side wall, and a fire check screen presented to said outer wall and enclosing said inner porous wall, said fire check screen ad said outer wall being in spaced relation to define a plenum chamber surrounding said inner porous wall;

(c) stop wall means dividing said plenum chamber into at least two independent portions to isolate said two portions from each other, and said stop wall means also dividing said inner porous wall into isolated portions equal in number to said plenum chamber independent portions;

(d) separate port means opening through said furnace outer wall into said plenum chamber independent portions;

(e) a source of fuel connected to each of said ports;

(f) a source of air connected to each of said sources of fuel to mix therewith for supporting combustion of the mix; and (g) control means operatively associated with said sources of fuel and air for sequentially admitting fuel and air to said isolated plenum chamber portions one at a time for combustion therein and for at the same time evacuating products of combustion one at a time from the other of said isolated plenum chamber portions, whereby the evacuation of products of combustion of fuel and air become heated and functions as a heat sink during the sequencing by said control means of the combustion in one of said plenum chamber and the evacuation of the products of combustion from the other of said plenum chambers.

4. Apparatus for processing gypsum material in a heat conservation furnace comprising:

(a) a kettle for receiving gypsum material to be heat treated;

(b) a furnace surrounding said kettle and including an outer wall, an inner porous luminous fire wall spaced from said outer wall and having a flame illuminated heating space surrounding said kettle;

(c) means said furnace dividing said space between said outer wall and said porous luminous fire wall into separate portions;

(d) controllable means connected into said furnace outer wall for supplying fuel and air into each of said separate portions one at a time for combustion in said separate portions of said porous luminous fire wall to release products of combustion into said heating space, and said controllable means including means for evacuating products of combustion from said heating space through each of said separate portions of said porous luminous fire wall one at a time; and (e) control means operably connected to said controllable mean for alternating the release of the products of combustion into said heating space and the evacuation of the products of combustion from said heating space in a sequence that maintains the temperature of the kettle higher than the temperature of the porous luminous fire wall, and alternates said separate portions of said porous luminous fire wall into a heat sink for returning the heat therein to support combustion.

* * * * *

UNITED STATES PATENT AND TRADEMARK OFFICE
CERTIFICATE OF CORRECTION

PATENT NO. : 5,007,825
DATED : April 16, 1991
INVENTOR(S) : Robert M. Williams

It is certified that error appears in the above-identified patent and that said Letters Patent is hereby corrected as shown below:

In column 6, line 17, between the words "means" and "said", place in the word "in".

In column 6, line 32, after "-lable", the word "mean" should read "means."

Signed and Sealed this

Twenty-eighth Day of July, 1992

Attest:

DOUGLAS B. COMER

*Attesting Officer*     *Acting Commissioner of Patents and Trademarks*